(12) United States Patent
Martin

(10) Patent No.: US 10,608,730 B2
(45) Date of Patent: Mar. 31, 2020

(54) MOBILE COMMUNICATIONS SYSTEM, COMMUNICATIONS TERMINALS AND METHODS FOR COORDINATING RELAY COMMUNICATIONS

(71) Applicant: SONY CORPORATION, Tokyo (JP)

(72) Inventor: Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/564,259

(22) PCT Filed: Apr. 15, 2016

(86) PCT No.: PCT/EP2016/058363
§ 371 (c)(1),
(2) Date: Oct. 4, 2017

(87) PCT Pub. No.: WO2016/184618
PCT Pub. Date: Nov. 24, 2016

(65) Prior Publication Data
US 2018/0138965 A1    May 17, 2018

(30) Foreign Application Priority Data

May 15, 2015 (EP) ..................................... 15167882

(51) Int. Cl.
*H04B 7/155* (2006.01)
*H04W 48/20* (2009.01)
(Continued)

(52) U.S. Cl.
CPC ........ *H04B 7/15507* (2013.01); *H04W 48/20* (2013.01); *H04L 5/0007* (2013.01);
(Continued)

(58) Field of Classification Search
CPC .. H04B 7/15507; H04W 24/08; H04W 88/04; H04W 72/085; H04W 8/24; H04W 40/22
See application file for complete search history.

(56) References Cited

U.S. PATENT DOCUMENTS

2010/0157845 A1\* 6/2010 Womack .............. H04B 7/2606
370/254
2015/0117193 A1\* 4/2015 Marupaduga ......... H04W 76/14
370/230.1
(Continued)

FOREIGN PATENT DOCUMENTS

WO    2014/153770 A1    10/2014
WO    2015/002456 A1    1/2015

OTHER PUBLICATIONS

"3rd Generation Partnership Project; Technical Specification Group Radio Access Network; Small cell enhancements for E-UTRA and E-UTRAN—Physical layer aspects (Release 12) Technical Report," 3GPP TR 36.872 V12.1.0, Dec. 2013, (100 pages).
(Continued)

*Primary Examiner* — Kan Yuen
(74) *Attorney, Agent, or Firm* — Xsensus LLP

(57) ABSTRACT

A mobile communications system, methods, and communication terminals. A first of plural communications terminals is configured to determine, based on current communications conditions, one of plural predetermined priority levels representing a relative ability of the first communications terminal to act as a relay node for a second of the plural communications terminals, and to transmit an indication of the determined priority level to the second communications terminals for one of the first or other communications terminals to be selected to act as a relay node for the second communications terminal. The second communications terminal is configured to receive from the first communications terminal the indication of the determined priority level, to (Continued)

receive from the other communications terminals indications of determined priority levels, to select one of the first communications terminals or one or more of the other communications terminals to act as a relay node for the second communications terminal.

18 Claims, 10 Drawing Sheets

(51) Int. Cl.
    *H04W 88/04*     (2009.01)
    *H04L 5/00*     (2006.01)
    *H04W 24/08*     (2009.01)

(52) U.S. Cl.
    CPC ........... *H04L 5/0044* (2013.01); *H04W 24/08* (2013.01); *H04W 88/04* (2013.01)

(56) References Cited

U.S. PATENT DOCUMENTS

| | | | |
|---|---|---|---|
| 2016/0037568 A1* | 2/2016 | Hakola | H04W 76/14 370/329 |
| 2016/0135203 A1 | 5/2016 | Kim et al. | |
| 2016/0212721 A1* | 7/2016 | Sheng | H04W 76/14 |
| 2017/0019832 A1* | 1/2017 | Kanda | H04L 65/80 |
| 2017/0347338 A1* | 11/2017 | Chen | H04W 8/005 |

OTHER PUBLICATIONS

Harri Holma, et al., "LTE for UMTS of DMA and SC-FDMA Based Radio Access," John Wiley & Sons, Ltd., 2009, (8 pages) (Table of Contents and Preface only).
International Search Report dated Jul. 7, 2016 in PCT/EP2016/058363 filed Apr. 15, 2016.
Chinese Office Action dated Dec. 20, 2019 in Chinese Application No. 2016800255281.

* cited by examiner

MOBILE COMMUNICATIONS SYSTEM, COMMUNICATIONS TERMINALS AND METHODS FOR COORDINATING RELAY COMMUNICATIONS

CROSS-REFERENCE TO RELATED APPLICATIONS

The present application is based on PCT filing PCT/EP2016/058363 filed Apr. 15, 2016, and claims priority to European Patent Application 15 167 882.8, filed in the European Patent Office on 15 May 2015, the entire contents of each of which being incorporated herein by reference.

TECHNICAL FIELD OF THE DISCLOSURE

The present disclosure relates to mobile communications systems, methods and communications terminals, and more specifically to providing an arrangement in which a first communications terminal may act as a relay node to relay communications with a base station for a second communications terminal.

Embodiments of the present technique can provide methods of communicating data in a small cell environment where the communications terminals may be configured to perform device-to-device communications, and communication terminals may be configured to act as relay nodes.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a number of new infrastructure architectures involving a variety of classes of devices, of wireless access point units and of applications which may require different data rates, coverage areas or transmission powers. Unlike a conventional third or fourth generation communications terminal such as a smartphone, an MTC-type terminal is preferably relatively simple and inexpensive, having a reduced capability. Examples of recent developments include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include relay nodes which provide assistance to local terminal communicating with a base station.

Whilst it can be convenient to have different systems addressing different needs from different mobile network users, the additions of new infrastructure and new services can also create an infrastructure problem, which is not desirable in a mobile network.

With the continuous growth in data transmitted in mobile networks, continually increasing network capacity comparatively is a problem faced by the industry. There are three parameters which can be changed in order to increase Radio Access network capacity: higher spectral efficiency, more radio spectrum and denser cell layout. The two former of these have limitations on the expected gains over today's LTE, and certainly improvements on the order of magnitude or more are not possible. Thus, in order to meet the stated 1000× capacity targets, small cells are getting a lot of attention [1].

However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications terminals, or when communications between communications terminals are required but the communications terminals may not be within the coverage area of a network. In order to address these limitations, in LTE release-12 the ability for LTE communications terminals to perform device-to-device (D2D) communications will be introduced.

D2D communications allow communications terminals that are in close proximity to communicate directly with each other, both when within and when outside of a coverage area or when the network fails. This D2D communications ability can allow user data to be more efficiently communicated between communications terminals by obviating the need for user data to be relayed by a network entity such as a base station, and also allows communications terminals that are in close proximity to communicate with one another although they may not be within the coverage area of a network. The ability for communications terminals to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Fourth generation networks have therefore been proposed as a cost effective solution for public safety communications compared to dedicated systems such as TETRA which are currently used throughout the world. However, the potential coexistence of conventional LTE communications and D2D communications within a single coverage area or network may increase the complexity of coordinating communications and resource allocation within an LTE network, and may also lead to potential compatibility issues between conventional and D2D capable LTE communications terminals.

It has been envisaged therefore that there is a requirement to perform D2D communications between a group of communications terminals which are outside of a coverage area of an LTE mobile communications network, which may communicate between devices using a repeat request communications protocol or the like.

SUMMARY OF THE DISCLOSURE

According to an example embodiment of the present disclosure there is provided a mobile communications system comprising an infrastructure equipment and a plurality of communications terminals. Each of the communications terminals comprises a transmitter configured to transmit signals via a wireless access interface to the infrastructure equipment and to transmit signals via the wireless access interface to the other communications terminals, and a receiver configured to receive signals via the wireless access interface from the infrastructure equipment and to receive signals via the wireless access interface from the other communications terminals. A first of the plurality of communications terminals is configured to determine, based on currently experienced communications conditions, one of a plurality of predetermined priority levels representing a relative ability of the first communications terminal to act as a relay node for a second of the plurality of communications terminals, and to transmit an indication of the determined priority level to the second communications terminals for one of the first communications terminal or one of the other communications terminals to be selected to act as a relay node for the second communications terminal.

The second communications terminal is configured to receive from the first communications terminal the indication of the determined priority level, to receive from one or more of the other communications terminals indications of determined priority levels, to select one of the first communications terminals or one or more of the other communications terminals to act as a relay node for the second communications terminal, wherein the selecting comprises determining from which of the first or the other communications terminals an indication of a best priority level was received, and to transmit signals representing data to the selected communications terminal for transmission to the infrastructure equipment and to receive signals representing data from the infrastructure equipment via the selected communications terminal. Employing a priority based cell selection/reselection process allows for the increase of efficiency of a mobile communications system.

When a communications terminal communicates with an eNodeB, it may move out of coverage. In this case, a relay node is required to be used in order to relay signals between the two. Optimising the efficiency of relayed communications is an important area of consideration in mobile communications systems.

Various further aspects and features of the present technique are defined in the appended claims, which includes a method of controlling communications in a mobile communications system, a first communications terminal forming part of a mobile communications system, a method of operating a first communications terminal forming part of a mobile communications system, a second communications terminal forming part of a mobile communications system, a method of operating a second communications terminal forming part of a mobile communications system, and circuitry for a mobile communications system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
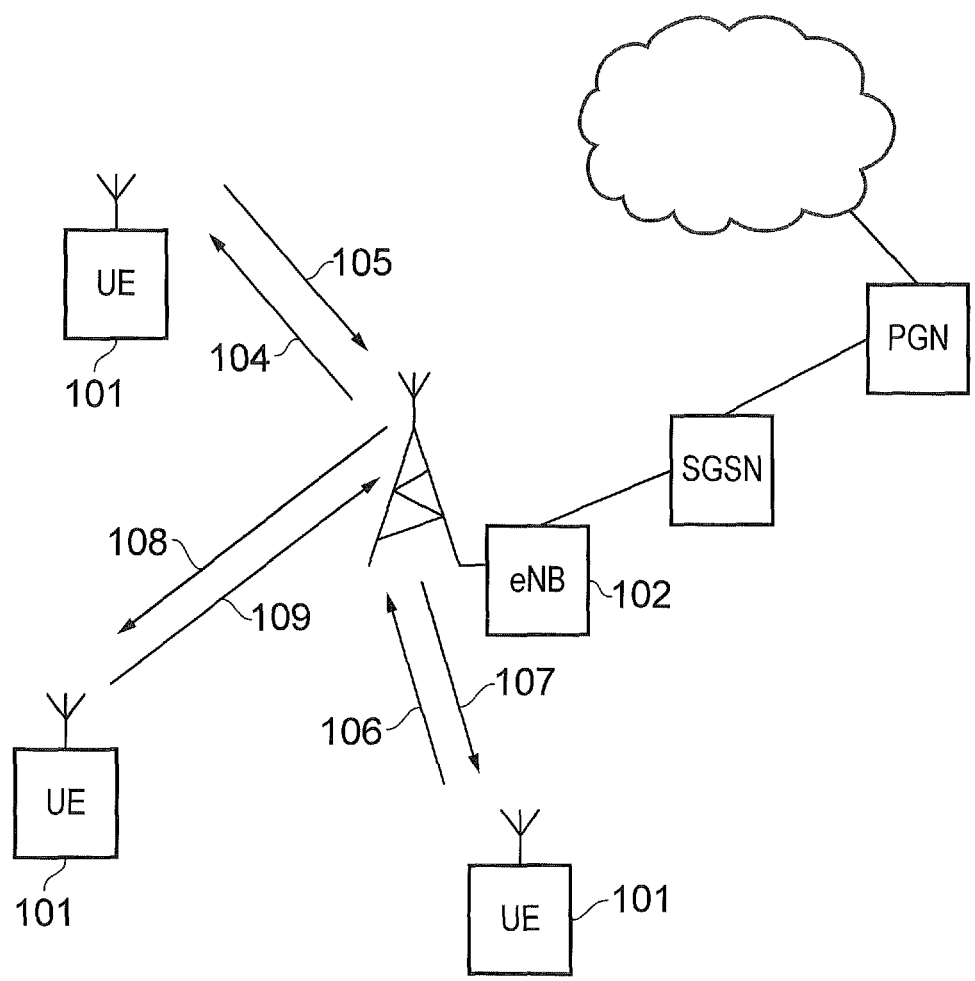
FIG. 1 provides a schematic diagram of a mobile communications system.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Device-to-Device Communications

FIG. 1 provides a schematic diagram of a conventional mobile telecommunications system 100, where the system includes mobile communications terminals 101, infrastructure equipment 102 and a core network 103. The infrastructure equipment may also be referred to as a base station, network element, enhanced Node B (eNodeB) or a coordinating entity for example, and provides a wireless access interface to the one or more communications terminals within a coverage area or cell. The one or more mobile communications terminals may communicate data via the transmission and reception of signals representing data using the wireless access interface. The network entity 102 is communicatively linked to core network components such as a serving gateway support node 103 a packet data gateway 103.1 and an external network 103.2, which may be connected to one or more other communications systems or networks which have a similar structure to that formed from communications terminals 101 and infrastructure equipment 102. The core network may also provide functionality including authentication, mobility management, charging and so on for the communications terminals served by the network entity. The mobile communications terminals of FIG. 1 may also be referred to as communications terminals, user equipment (UE), terminal devices and so forth, and are configured to communicate with one or more other communications terminals served by the same or a different coverage area via the network entity. These communications may be performed by transmitting and receiving signals representing data using the wireless access interface over the two way communications links represented by lines 104 to 109, where 104, 106 and 108 represent downlink communications from the network entity to the communications terminals and 105, 107 and 109 represent the uplink communications from the communications terminals to the network entity. The communications system 100 may operate in accordance with any known protocol, for instance in some examples the system 100 may operate in accordance with a 3GPP Long Term Evolution (LTE) standard where the network entity and communications terminals are commonly referred to as eNodeB and UEs, respectively.

A brief description of the LTE wireless access interface is explained in the following paragraphs with reference to FIGS. 2 and 3 to support the explanation of the example embodiments of the present technique which are provided in the following paragraphs.

Figure 2:
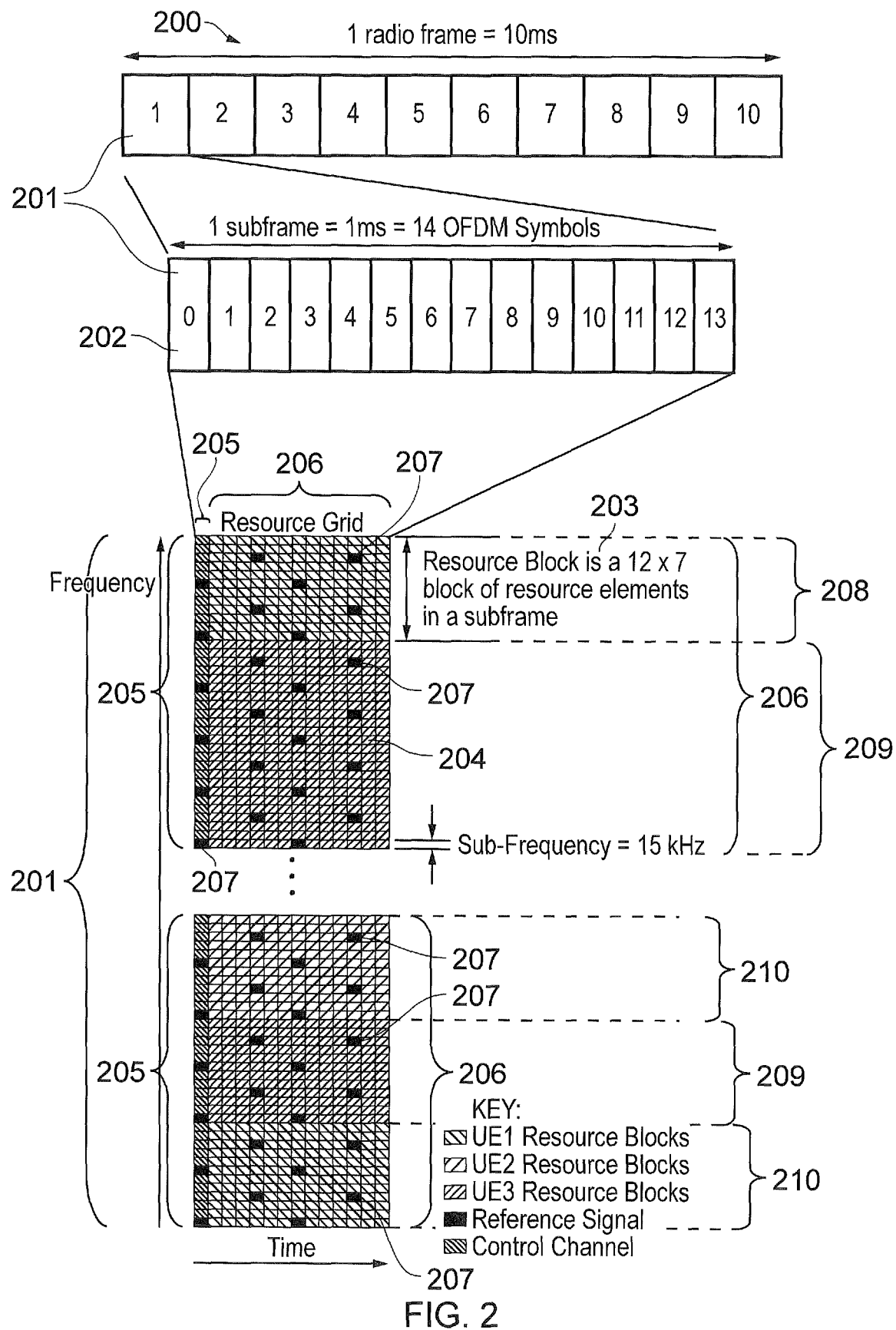
FIG. 2 provides a schematic diagram of the structure of a downlink of a wireless access interface of a mobile communications system.

FIG. 2 provides a simplified schematic diagram of the structure of a downlink of a wireless access interface that may be provided by or in association with the eNodeB of FIG. 1 when the communications system is operating in accordance with the LTE standard. In LTE systems the wireless access interface of the downlink from an eNodeB to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.25 MHZ and 20 MHz bandwidth may be divided into 128 to 2048 orthogonal subcarriers for example. Each subcarrier bandwidth may take any value but in LTE it is fixed at 15 KHz. As shown in FIG. 2, the resources of the wireless access interface are also temporally divided into frames where a frame 200 lasts 10 ms and is subdivided into 10 subframes 201 each with a duration of 1 ms. Each subframe is formed from 14 OFDM symbols and is divided into two slots each of which comprise six or seven OFDM symbols depending on whether a normal or extended cyclic prefix is being utilised between OFDM symbols for the reduction of intersymbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element.

In the simplified structure of the downlink of an LTE wireless access interface of FIG. 2, each subframe 201 comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [3].

Resources within the PDSCH may be allocated by an eNodeB to communications terminals (UEs) being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 2, UE1 has been allocated resources 208 of the data region 206, UE2 resources 209 and UE resources 210. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

Figure 3:
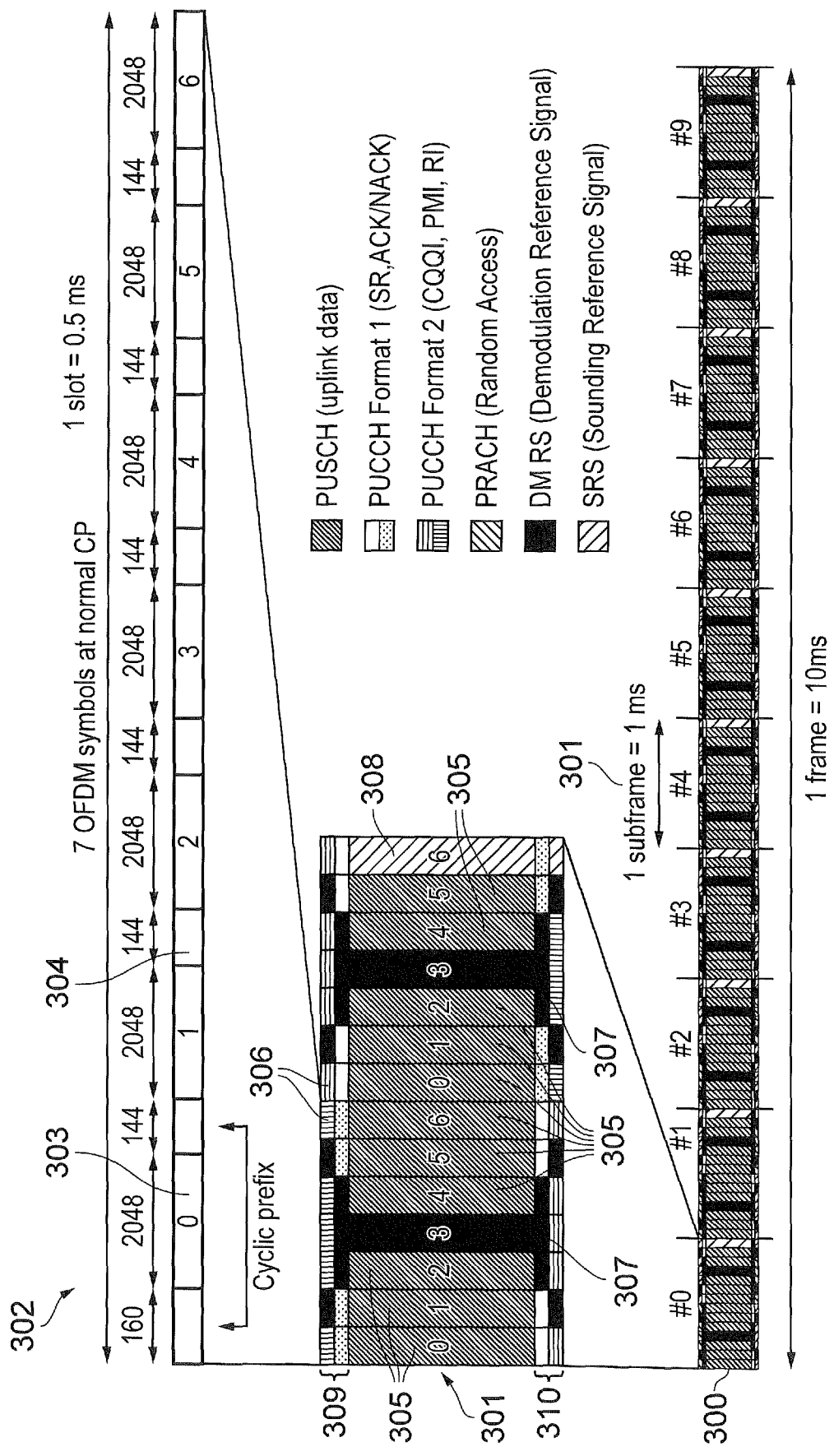
FIG. 3 provides a schematic diagram of an uplink of a wireless access interface of a mobile communications system.

FIG. 3 provides a simplified schematic diagram of the structure of an uplink of an LTE wireless access interface that may be provided by or in association with the eNodeB of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to ten subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. In FIG. 3 a normal cyclic prefix is used and therefore there are seven OFDM symbols within a subframe, however, if an extended cyclic prefix were to be used, each slot would contain only six OFDM symbols. The resources of the uplink subframes are also divided into resource blocks and resource elements in a similar manner to downlink subframes.

Each uplink subframe may include a plurality of different channels, for example a physical uplink shared channel (PUSCH) 305, a physical uplink control channel (PUCCH) 306, and a physical random access channel (PRACH). The physical Uplink Control Channel (PUCCH) may carry control information such as ACK/NACK to the eNodeB for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the eNodeB. Further information on the structure and functioning of the physical channels of LTE systems can be found in [1].

In an analogous manner to the resources of the PDSCH, resources of the PUSCH are required to be scheduled or granted by the serving eNodeB and thus if data is to be transmitted by a UE, resources of the PUSCH are required to be granted to the UE by the eNodeB. At a UE, PUSCH resource allocation is achieved by the transmission of a scheduling request or a buffer status report to its serving eNodeB. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the eNodeB is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the eNodeB and gives the eNodeB information regarding the amount of data in an uplink buffer or buffers at the UE. After receiving the buffer status report, the eNodeB can allocate a portion of the PUSCH resources to the sending UE in order to transmit some of its buffered uplink data and then inform the UE of the resource allocation via a DCI in the PDCCH. For example, presuming a UE has a connection with the eNodeB, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating eNodeB, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an eNodeB is required if UEs, even when in close proximity, wish to communicate with one another. These limitations may be problematic when the system is experiencing high load or eNodeB coverage is not available, for instance in remote areas or when eNodeBs are not functioning correctly. Overcoming these limitations may increase both the capacity and efficiency of LTE networks but also lead to the creations of new revenue possibilities for LTE network operators.

D2D communications offer the possibility to address the aforementioned problems of network capacity and the requirement of network coverage for communications between LTE devices. For example, if user data can be communicated directly between UEs only one set of resources is required to communicate the data rather than both uplink and downlink resources. Furthermore, if UEs are capable of communicating directly, UEs within range of each other may communicate even when outside of a coverage area provided an eNodeB. As a result of these potential benefits, the introduction of D2D capabilities into LTE systems has been proposed.

Figure 4:
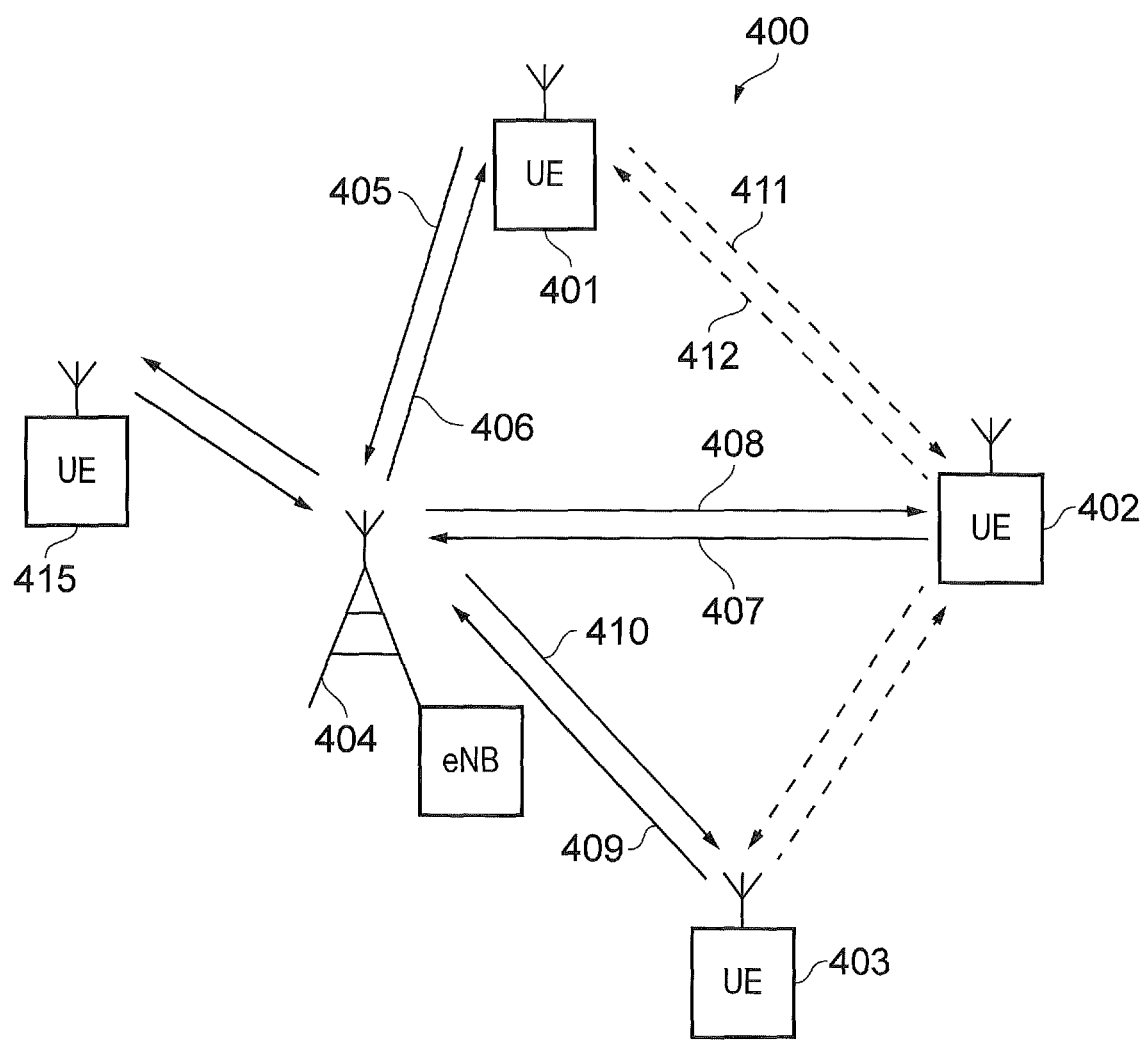
FIG. 4 provides a schematic diagram of a mobile communications system in which communications terminals can perform device-to-device communications.

FIG. 4 provides a schematic diagram of a mobile communications system 400 that is substantially similar to that described with reference to FIG. 1 but where the UEs 401 402 403 are also operable to perform direct device-to-device (D2D) communications with one another. D2D communications comprise UEs directly communicating data between one another without user and or control data being communicated via a dedicated coordinating entity such as an eNodeB. For example, in FIG. 4 communications between the UEs 401, 402, 403, 415 and the eNodeB 404 are in accordance with the existing LTE standard, but as well as communicating via the uplink and downlinks 405 to 410, when the UEs 401 to 403 are within range of each other they may also communicate directly with one another via the D2D communication links 411 to 414. In FIG. 4 D2D communications links are indicated by dashed lines and are shown to exist between 401 and 402, and 402 and 403 but not between 401 and 403 because these UEs are not sufficiently close together to directly transmit and receive signals to and from one another. D2D communications links are also shown not to exist between 415 and other UEs because UE 415 is not capable of D2D communications. A situation such as that illustrated in FIG. 4 may exist in an LTE network where UE 415 is a device not compliant with the specifications for D2D operation.

In order to establish a D2D communications link, such a one-way D2D communications link 414 from the UE 402 to the UE 403, a number of steps are required to be performed. Firstly, it is beneficial for the initiating UE to have knowledge of the other D2D capable UEs within range. In an LTE system this may be achieved for example by each UE periodically transmitting a discovery signal containing a unique "discovery" identifier that identifies UEs to one another. Alternatively, a serving eNodeB or coordinating entity may compile a list of UEs within its coverage area capable of performing D2D communications and distribute the list to the appropriate UEs within its coverage area. By virtue of either of the above processes the UE 401 may discover UE 402, UE 402 may discover UEs 401 and 403, and UE 403 may discover UE 402. Once UE 402 is aware of the existence of UE 403 it may then proceed to establishing a D2D communications link with UE 403.

Relay Nodes

Figure 5:
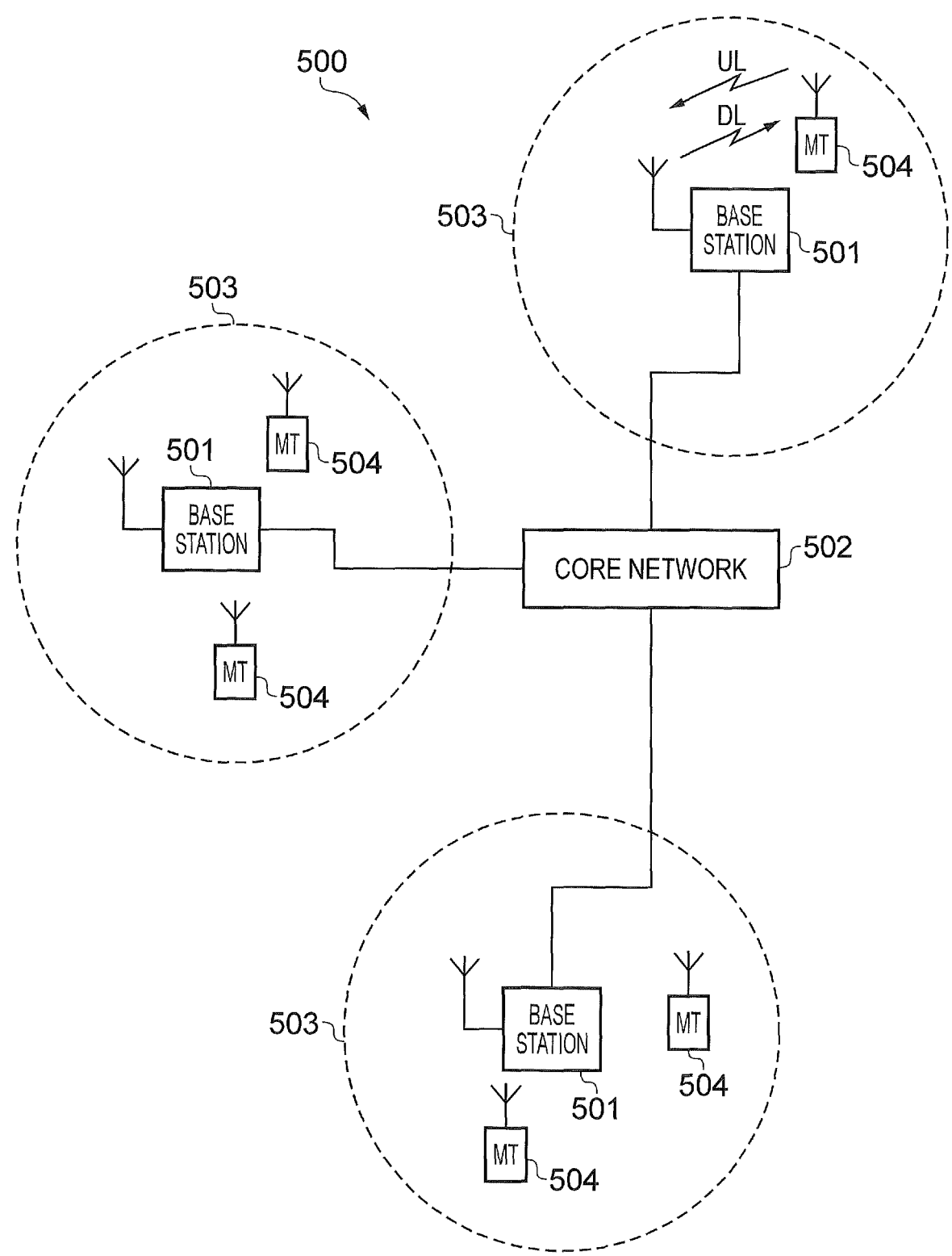
FIG. 5 provides a schematic diagram of a mobile communications system according to an example of an LTE standard.

FIG. 5 provides a schematic diagram illustrating some basic functionality of a conventional mobile telecommunications network, using for example a 3GPP defined UMTS and/or Long Term Evolution (LTE) architecture. The mobile telecommunications network/system 500 of FIG. 5 operates in accordance with LTE principles and which may be adapted to implement embodiments of the disclosure as described further below. Various elements of FIG. 5 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 500 includes a plurality of base stations 501 connected to a core network 502. Each base station provides a coverage area 503 (i.e. a cell) within which data can be communicated to and from terminal devices 504. Data is transmitted from base stations 501 to terminal devices 504 within their respective coverage areas 503 via a radio downlink. Data is transmitted from terminal devices 504 to the base stations 501 via a radio uplink. The uplink and downlink communications are made using radio resources that are licenced for use by the operator of the network 500. The core network 502 routes data to and from the terminal devices 504 via the respective base stations 501 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 501 of FIG. 5 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 501 may be realized as any other types of base stations such as a NodeB and a base transceiver station (BTS). The base station 501 may include a main body (that is also referred to as a base station apparatus) configured to control radio communication, and one or more remote radio heads (RRH) disposed in a different place from the main body. In addition, various types of terminals, which will be described below, may each operate as the base station 501 by temporarily or semi-persistently executing a base station function.

Any of the communications terminals 504 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications terminal 504 may also be realized as a terminal (that is also referred to as a machine type communication (MTC) terminal) that performs machine-to-machine (M2M) communication. Furthermore, the terminal apparatus 504 may be a radio communication module (such as an integrated circuit module including a single die) mounted on each of the terminals.

In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carrier is available.

Figure 6:
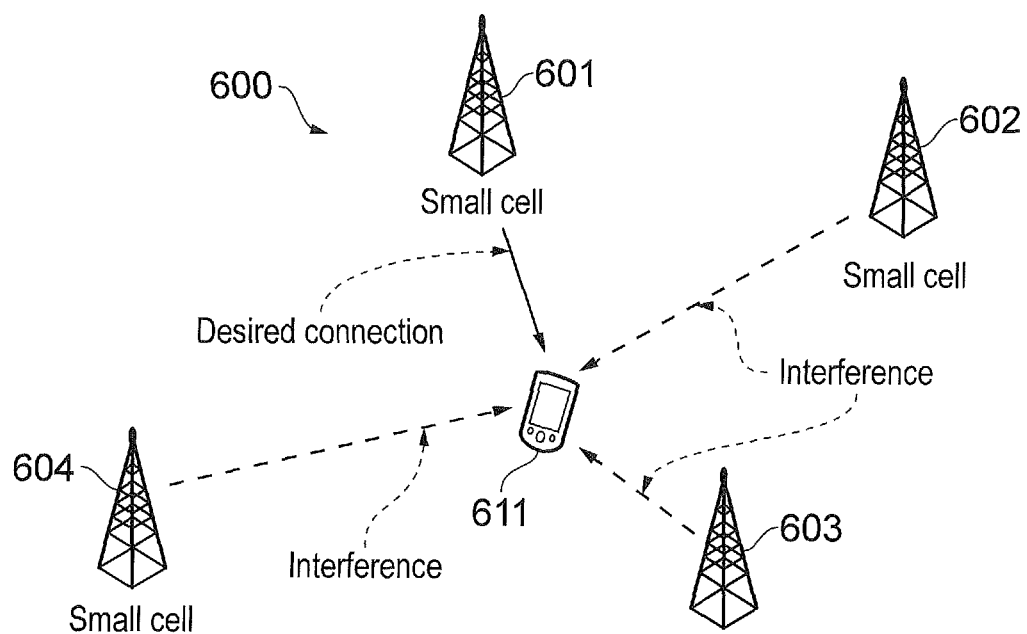
FIG. 6 schematically illustrates an example of a small cell environment.

FIG. 6 illustrates an example of a small cell environment 600 wherein a plurality of base stations 601 to 604 are operable to communicate with terminals, such as terminal 611. In this example, the terminal 611 is in communication with base station 601 providing a first small cell but is within the range of the small cell for each of base stations 602, 603 and 604. As a result, the signals sent by base station 601 to terminal 611 can suffer from interference from signals transmitted by base stations 602 to 604. While with conventional macrocell networks the same type of situation would also be likely, in practice, the mobile operator is in a position to carry out frequency planning, distributing frequencies amongst base stations in a static or dynamic manner. Accordingly, the level of interference can be significantly reduced for macrocells. On the other hand, when dealing with a small cell network, there may be a potentially very large number of base stations, each using different powers such that network planning becomes much more difficult, and the complexity also increases with the number of active small cells in an area. In particular, if a large number or small cells are available in an area, it is likely that they will not be able to each be allocated a different, non-overlapping frequency bands such that transmissions from different cells would not interfere with each other. Moreover, small cell networks have the additional difficulty that a small cell may be mobile, i.e. not stationary, while network planning for a macrocell or legacy femto/picocells was generally based on stationary or fixed base stations. This also increases the complexity of trying to reduce interference significantly. Of course, interference between small cells can be significant when the number of deployed small cells increases such that in a dense small cell environment, interference reduction can be challenging. As a result, in the event that the interference affects synchronisation signals or reference signals of small cells, terminals may not even be able to discover and connect to small cells.

Figure 7:
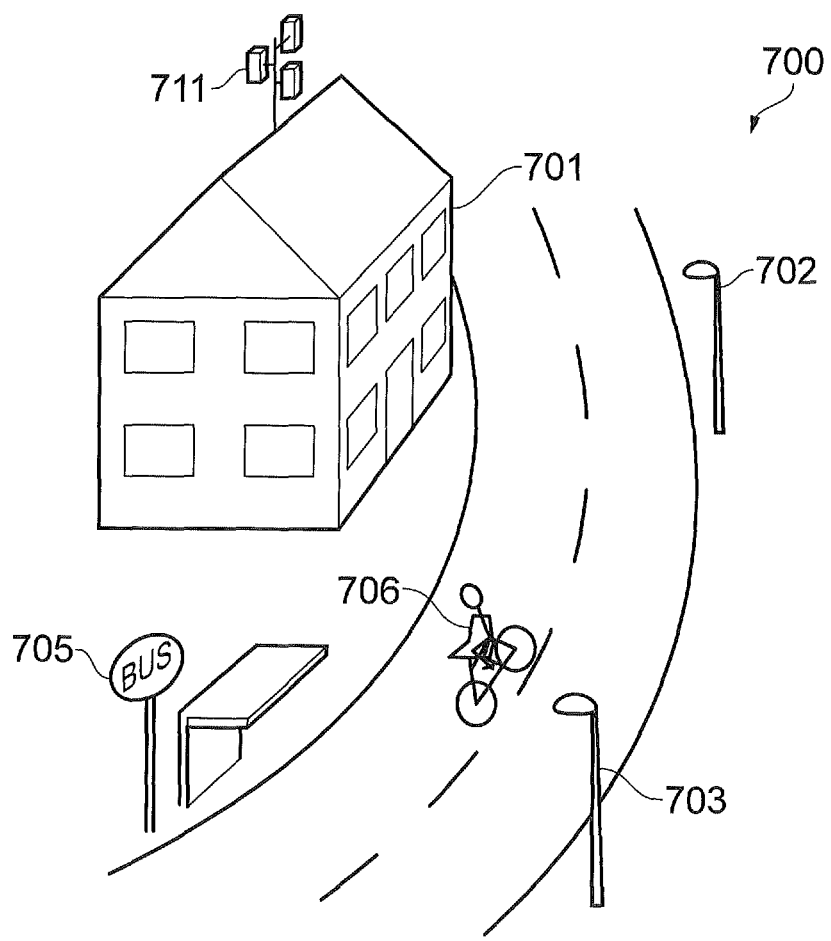
FIG. 7 illustrates another example of a small cell environment.

An example of a small cell environment 700 is illustrated in FIG. 7, where a macrocell base station 711 is provided in the same area as small cells provided by a base station 701 in or in the vicinity of a building, by a base station 702 in a first lamppost, by a base station 703 in a second lamppost, by a base station 705 provided in a bus stop and by a mobile base station 706 provided in a cyclist back-pack. In this example, the planning for interference may vary depending on traffic and on time. For example a cyclist may enter an interference zone this zone. However, the base station 701, if serving an office, may potentially only be used during office hours and may be turned off during the rest of the day or the rest of the week. A variety of base stations may thus be providing a small or macro cell and the base station may have very different profile regarding time of use, frequency capabilities, power/range, additional functionalities, etc.

Figure 8:
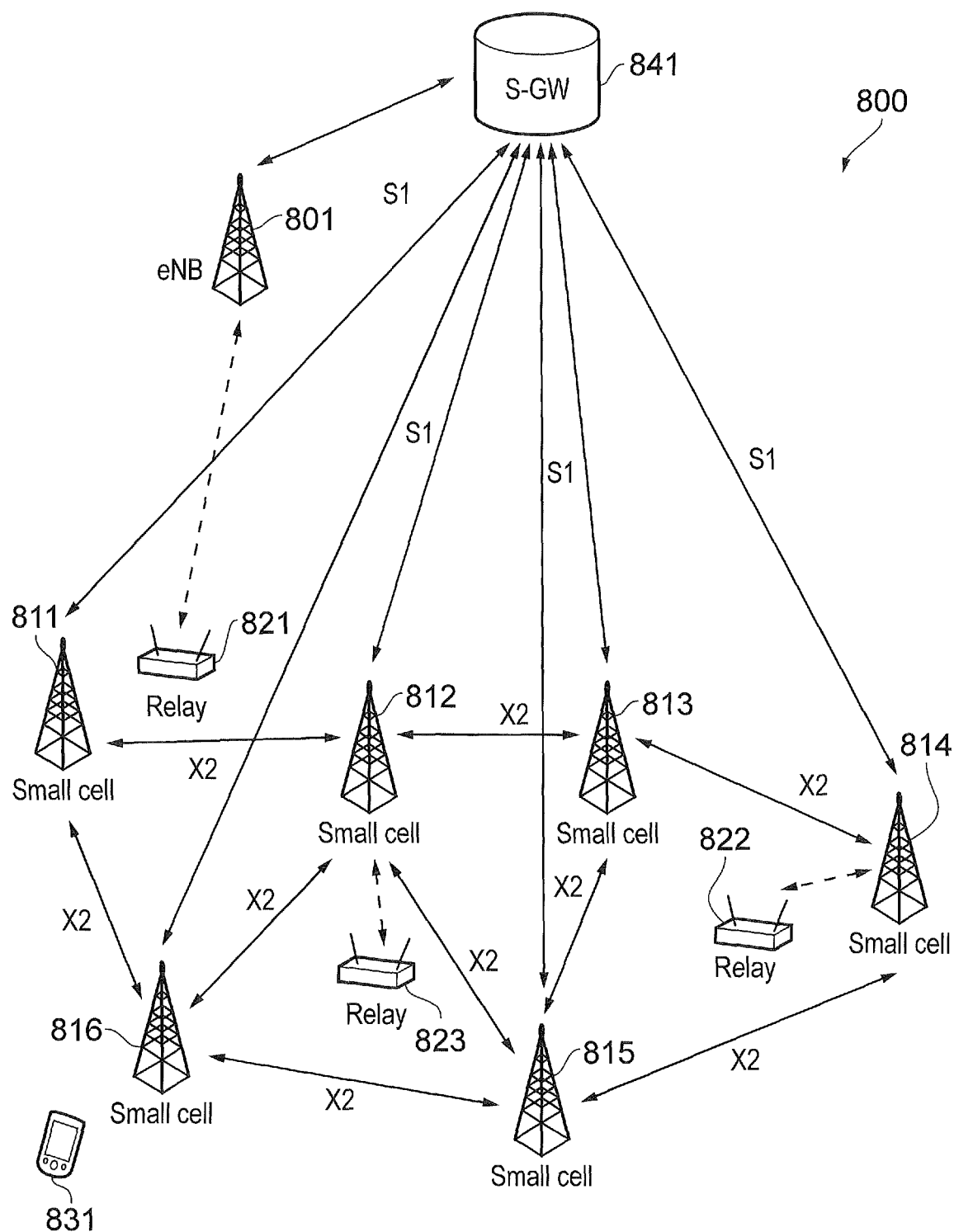
FIG. 8 illustrates an example system for communicating with at least a terminal in a heterogeneous network.

Moreover, mobile networks can also include relay nodes which can further increase the complexity of the mobile system and of the reduction of interference in a small cell network. FIG. 8 illustrates an example system 800 for communicating with at least a terminal 831. In this system 800, a base station 801 provides a macrocell and six base stations 811 to 816 provide small cell coverage, potentially overlapping with the coverage of the base station 801. Additionally, three relay nodes 821 to 823 are provided and are operating with base stations 801, 814 and 812, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, a backhaul link may also be provided over a wired connection. This is in contrast to a small cell base station which, as mentioned above, can generally operate like a base station and is thus connected to the core network, as illustrated by the arrows between the small cell base stations 811 to 816 and the Serving Gateway "S-GW" in FIG. 8. Relay nodes may also send or receive data with the terminals or base stations, forming an ad-hoc network which can also add to the complexity of dealing with interference in an environment as illustrated in FIG. 8.

Relay technologies are known generally to provide an arrangement for receiving signals from a base station and for retransmitting the received signals to a user equipment (UE, a communications terminal) in a mobile communications network, or to receive signals transmitted from a UE for re-transmission to a base station of a mobile communications network. The aim of such relay nodes is to try to extend a radio coverage area provided by a mobile communications network to reach communications terminals which would otherwise be out of range of the mobile communications network or to improve the ratio of successful transmissions between a terminal and a base station.

In-coverage devices, which may include current relay UEs (UEs operating as relay nodes) or UEs which are not currently acting as relay nodes but have the potential to do so, may calculate a priority level based on measurements taken by each of the UEs, and/or other criteria such as load. These priority levels may be communicated to remote, in-coverage or out-of-coverage UEs via the D2D synchronisation signal (D2DSS) or discovery or beacon message. The remote UEs may take the received priority levels into account when performing relay selection or relay reselection.

This may be advantageous in that the link quality of both the interface between two UEs (PC5) and the interface between UEs and the eNodeB (Uu) may be taken into account when performing relay selection or relay reselection, rather than just the quality of the link between the remote UE and the candidate relay UE. Excessive signalling overheads are avoided, in that the link quality measurements between the relay UEs and eNodeB need only to be broadcast to the remote UEs. Should the priority levels be communicated to the remote UEs with each priority level having unique communications resources, then no decoding of signals is necessary by the remote UEs in order for the remote UEs to work out which relay UE has the highest priority. Further, the relay UEs and/or eNodeB can carry out most of the evaluation in terms of measurements, reducing the amount of data that has to be transmitted to the remote UEs, and the amount of processing required for the remote UEs to carry out. Overall, the present disclosure may provide a more efficient arrangement of a mobile communications system comprising an infrastructure equipment (such as an eNodeB or a base station) and a plurality of communications terminals (or UEs) than previously disclosed mobile communications systems.

Priority Based D2D Relay Selection

According to an example embodiment of the present disclosure there is provided a mobile communications system comprising an infrastructure equipment and a plurality of communications terminals. Each of the communications terminals comprises a transmitter configured to transmit signals via a wireless access interface to the infrastructure equipment and to transmit signals via the wireless access interface to the other communications terminals, and a receiver configured to receive signals via the wireless access interface from the infrastructure equipment and to receive signals via the wireless access interface from the other communications terminals. A first of the plurality of communications terminals is configured to determine, based on currently experienced communications conditions, a priority level from a plurality of predetermined priority levels, and to transmit an indication of the determined priority level to a second of the plurality of communications terminals.

Figure 9:
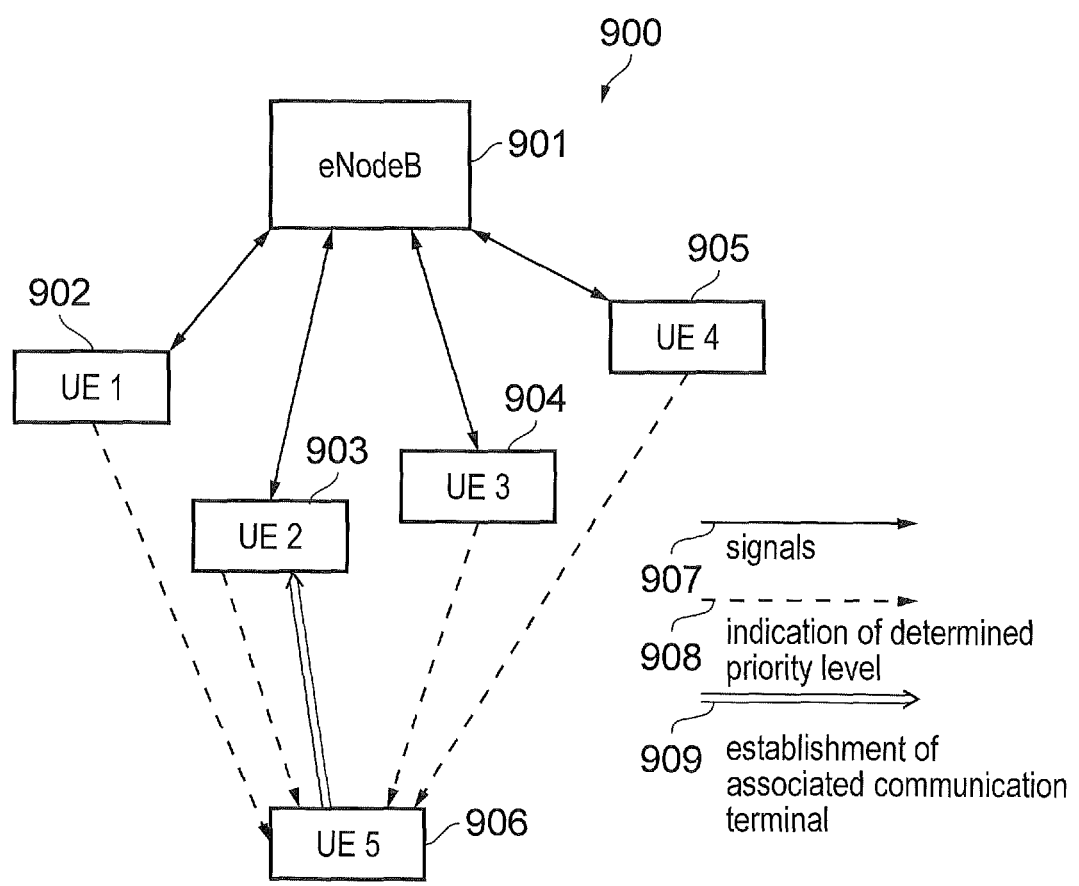
FIG. 9 illustrates an example mobile communications system in accordance with the present technique.

The second communications terminal is configured to receive from the first communications terminal the indication of the determined priority level, to receive from one or more of the other communications terminals indications of determined priority levels, to establish an associated communications terminal, wherein the establishing the associated communications terminal comprises determining from which of the other communications terminals an indication of a best priority level was received, and to transmit signals comprising data to the associated communications terminal for transmission to the infrastructure equipment and to receive signals comprising data from the infrastructure equipment via the associated communications terminal. FIG. 9 illustrates an example mobile communications system 900 in accordance with an arrangement of the present disclosure.

The system comprises an eNodeB 901 and four communications terminals, or UEs 902 to 906. The first four UEs 902 to 905 are operating as relay UEs, and are able to relay signals between the eNodeB 901 and the fifth UE 906, which is operating as a remote UE. The relay UEs 902 to 905 are configured to transmit and receive signals 907 to and from the eNodeB 901. These relay UEs 902 to 905 are configured to determine, based on currently experienced communications conditions, a level of priority that reflects their candidacy or ability for relaying signals between the remote UE 906 and the eNodeB 901. These currently experienced communications conditions include, but are not limited to, an amount of traffic load of each of the relay UEs 902 to 905, based on a current amount of data being transmitted and received by the relay UEs 902 to 905, the number of remote UEs 906 currently being served by the relay UEs 902 to 905, and a measured quality of a communications link between each of the relay UEs 902 to 905 and the eNodeB 901 which may be measured by the relay UEs 902 to 905 while transmitting and receiving the signals 907. The relay UEs 902 to 905 are then configured to transmit an indication of their priority levels 908 to the remote UE 906.

The remote UE 906 is configured to receive the indications of relative priority levels 908 from each of the relay UEs 902 to 905. The remote UE 906 is then configured to determine, based upon these predetermined priority levels, as well as a measured quality of a communications link between the remote UE 906 and each of the relay UEs 902 to 905, which of the relay UEs 902 to 905 is the best candidate to relay signals between the remote UE 906 and the eNodeB 901. The remote UE 906, in this example arrangement, determines that the second relay UE 902 is the best choice, and so establishes an association with it, by sending an association message 909. Now, the remote UE 906 may transmit signals representing data to the relay UE 903 for transmission on to the eNodeB 901, and receive signals from the eNodeB 901 via the relay UE 903.

There are several mobility scenarios to handle. In addition to an initial relay UE selection for a remote UE out of coverage there needs to be a way to select and connect to a relay UE when a device moves from in-coverage to out-of-coverage (which would require the connection to be moved from eNodeB to the relay UE), as well as when a device moves from the coverage of one relay UE to another relay UE (requiring the connection to be moved from the initial relay UE to the new relay UE). One could envisage a process similar to handover or reselection between eNodeBs, with the target being a new UE-to-network relay rather than an eNodeB, and the source being either an eNodeB or a current UE-to-network relay.

Figure 10:
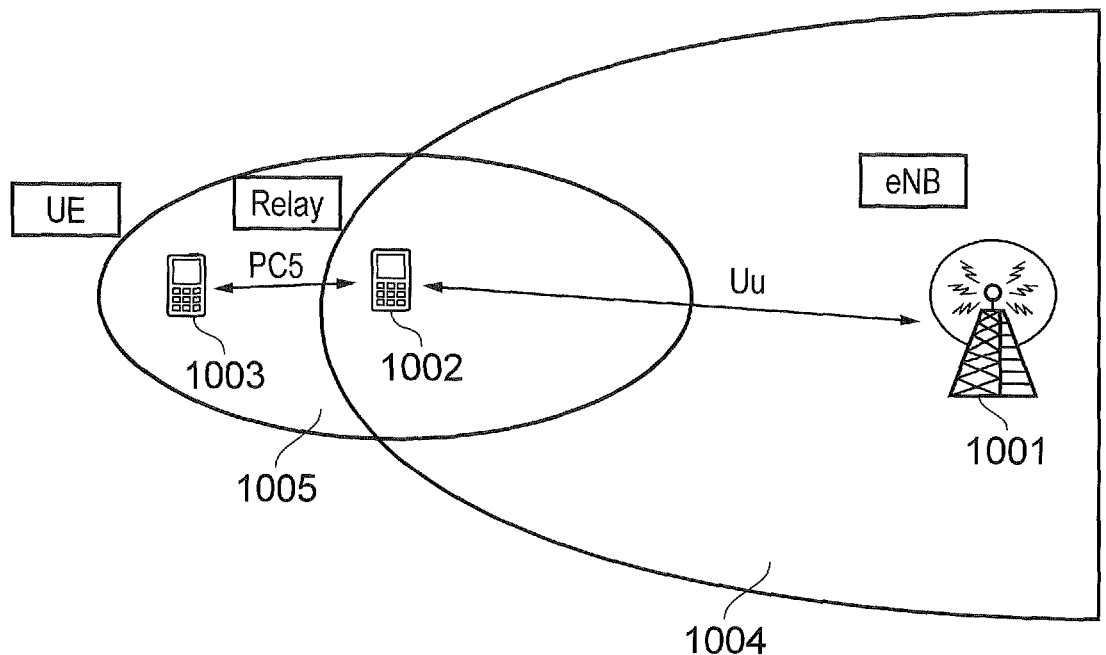
FIG. 10 illustrates an example of a UE-to-network relay for support of coverage extension in accordance with the present technique.

An example of the UE-to-network relay scenario in accordance with the present disclosure is summarised in FIG. 10. A UE 1003, which may have previously communicated with an eNodeB 1001 is currently outside of a coverage area 1004 of the eNodeB 1001. However, the UE 1003 is inside a coverage area 1005 of a relay 1002, which is also inside the coverage area 1004 of the eNodeB 1001. Therefore, the UE 1003 associates itself with the relay 1002, setting up a communications link. Signals may now be transmitted by the UE 1003, and relayed by the relay 1002 to the eNodeB 1001. In return, signals transmitted by the eNodeB 1001 may be received by the 1003 via the relay 1002.

Figure 11:
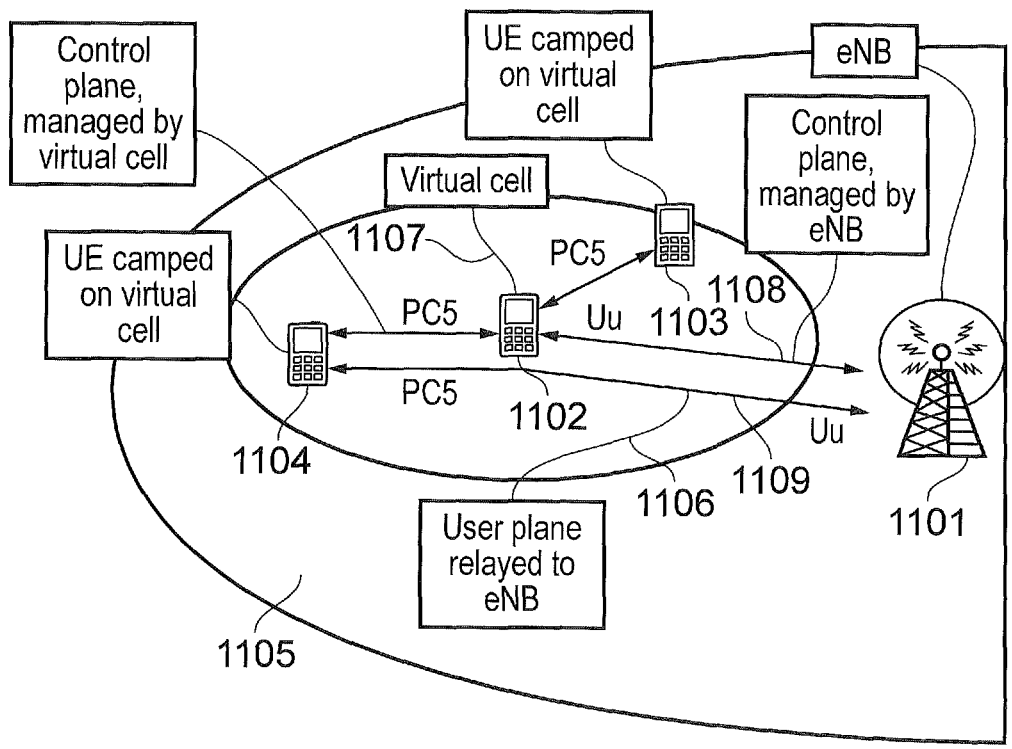
FIG. 11 illustrates an example of a UE virtual cell in accordance with the present technique.

FIG. 11 demonstrates an example of a UE virtual cell use case for 5G networks (fifth generation of mobile networks) in a mobile communications system in accordance with the present disclosure. The mobile communications system of FIG. 11 comprises an eNodeB 1101 with a coverage area 1105 and three UEs 1102 to 1104. The UE 1102 has a coverage area 1106 and is the UE virtual cell. The UE virtual cell 1102 is largely based on the UE-to-network relay, with the main differences mainly being that the use case for the UE virtual cell 1102 is to increase the network capacity while remaining in-coverage of the eNodeB 1101.

The UE virtual cell 1102 maintains a single control plane connection to the macro network eNodeB 1101, and is granted the right to manage the UEs 1103, 1104 which are connected to it as an eNodeB 1101 would (e.g. control of mobility, resource allocation, etc.). In other words, the control plane 1107 from the UEs 1103, 1104 camped on the virtual cell 1102 is terminated at the virtual cell 1102, while the virtual cell 1102 has a separate control plane 1108 with the eNodeB 1101. A user-plane 1109 is relayed to the eNodeB 1101.

There needs to be a way to manage mobility so that a UE camped on a UE virtual cell may select another virtual cell, or UE camped on an eNB may camp on a virtual cell. It is acknowledged by the 3GPP RAN2 group that:

For the relay discovery and relay selection both in-coverage and out-of-coverage scenarios remote UEs can be addressed.

Discussion is required for the potential minimisation of service interruption for the cases where the UE is moving from in-coverage to out-of-coverage and from out-of-coverage to in-coverage.

Relay UE will always be in-coverage. The eNodeB at the radio level can control whether the UE can act as a relay. It is for further study to determine whether the network control is per relay UE, per cell (broadcast configuration), or both.

In terms of relay selection, it is agreed that:

The remote UE can take radio level measurements of the PC5 radio link quality (between the remote UE and relay UE). For out-of-coverage, the radio level measurements can be used by the remote UE together other higher layer criteria to perform relay selection.

For in-coverage, it is for further study to determine how these measurements are used (e.g. the measurements can be used by the UE to perform selection similar to out-of-coverage case, or they can be reported to the eNodeB).

It is for further study to determine how reselection is handled and who performs reselection decision, and to determine if Uu link (between UEs and the eNodeB) quality is required for selection/reselection purposes.

To avoid relay UEs having to broadcast excessive amounts of information to a remote UE, and to avoid the remote UE performing additional processing when performing a reselection calculation, the relay UEs first calculate a priority based on measurements of the Uu link quality (i.e. measurement of eNodeB downlink signal, wherein a better quality means a higher priority) and/or calculate a priority based on load (e.g. lower priority if the relay is already serving one or more UEs). The priority may be explicitly set by the eNB rather than calculated in the UE, for example based on measurements reported by the relay to the eNB. There may be a set of predetermined priority levels from which one can be chosen.

Only the priority level needs to be communicated to the remote UE—for example 8 priority levels can be communicated using 3 bits.

The remote UE would then perform a measurement and reselection procedure similar to that used today for inter-frequency and inter-RAT mobility. The UE selects the best quality relay based on the PC5 (device-to-device) link quality from the highest priority relays measured. Alternatively the remote UE selects the highest priority relay from the set of relays meeting a selection condition (e.g. signal is above a threshold).

In the case that the remote UE is in the coverage of an eNB, then the measurements could be reported to the eNodeB and relay selection is performed by the eNodeB (e.g. similar to handover)

Figure 12:
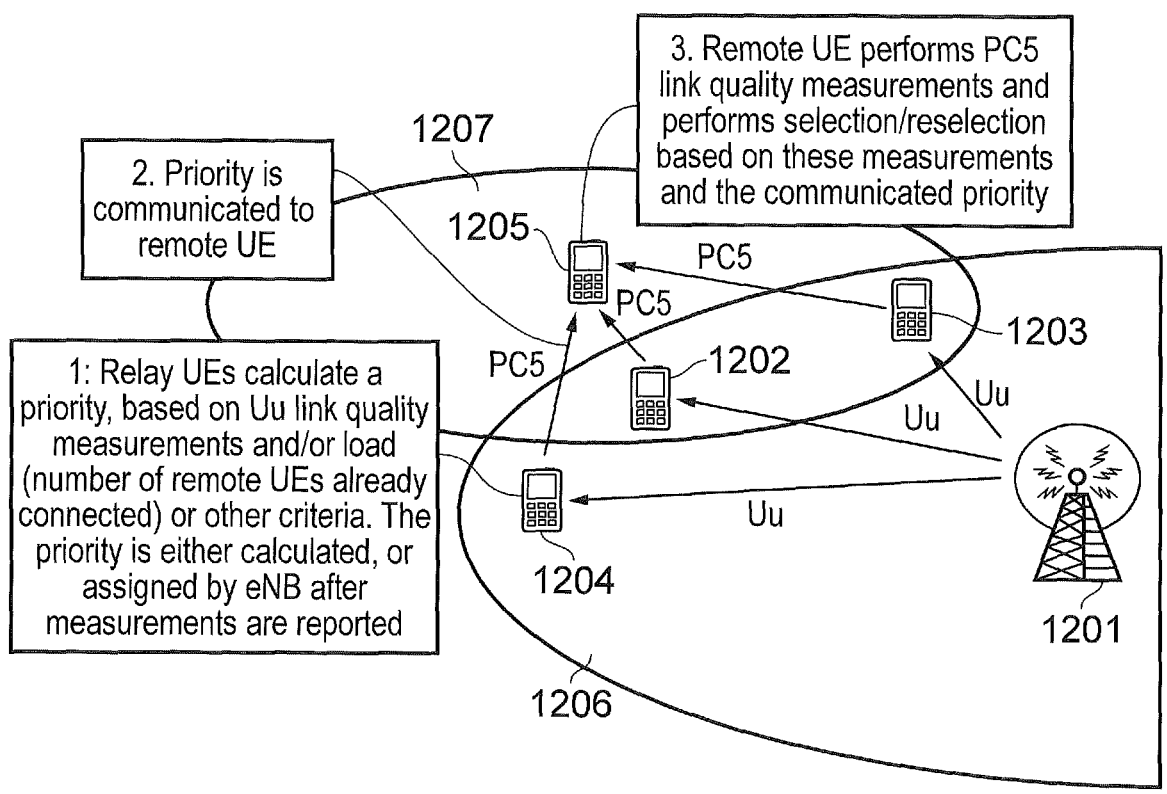
FIG. 12 illustrates an example of a priority based relay reselection in accordance with the present technique.

FIG. 12 demonstrates an example of a priority based relay reselection process in a mobile communications system in accordance with the present disclosure. The mobile communications system comprises an eNodeB 1201 with a coverage area 1206, and UEs 1202 to 1205. UEs 1202 to 1204 are relay UEs inside the coverage area 1206 of the eNodeB 1201, and UE 1205 is a remote UE with a coverage area 1207.

In step one of the process, the relay UEs 1202 to 1204 calculate a priority, based on Uu link quality measurements and/or load (in terms of either the traffic load or the number of remote UEs already connected) or other criteria, such as communication resource usage, Uu interface throughput, or relay device capabilities such as the number of antennas. The priority is either calculated, or assigned by the eNodeB 1201 after measurements are reported.

In step two of the process, these priorities are communicated to the remote UE 1205.

In step three of the process, the remote UE 1205 performs PC5 link quality measurements and performs selection and/or reselection based on these measurements and the communicated priorities.

A detailed example of the process according to FIG. 12 is given below.

Step 1

A priority needs to be calculated based on some criteria. In an example scenario in accordance with the present disclosure, there may be eight possible priority levels, and the priority is calculated both on Uu link quality measurements and whether or not a relay UE is already serving a remote UE. Priority levels 1-6 may be assigned to relay UEs without any remote UE associated with them, and the remaining lower priority levels 7 and 8 could be used for a relay UE which already has a remote UE associated with it.

The relay needs to be in-coverage, and a number of ranges of measured reference signal received power/quality RSRP/RSRQ could be defined for each priority. For example, Relay UE with Current Remote UE:
Qrxlevmin<=Qrxlev,meas<=Qrxlevmin+30–priority 8.
Qrxlevmin+30<=Qrxlev,meas<=Qrxlevmin+60–priority 7.
Relay UE with no current remote UE:
Qrxlevmin<=Qrxlev,meas<=Qrxlevmin+10–priority 6.
Qrxlevmin+10<=Qrxlev,meas<=Qrxlevmin+20–priority 5.
Qrxlevmin+10<=Qrxlev,meas<=Qrxlevmin+30–priority 4.
Qrxlevmin+10<=Qrxlev,meas<=Qrxlevmin+40–priority 3.
Qrxlevmin+10<=Qrxlev,meas<=Qrxlevmin+50–priority 2.
Qrxlevmin+10<=Qrxlev,meas<=Qrxlevmin+60–priority 1.

The above calculation could be carried out by the relay UE. Alternatively, the eNodeB may receive measurement reports and assign a priority to the UE.

Step 2

The priority needs to be communicated to the remote UE(s). An example way in which this could be done could be to include some bits in the D2DSS, or in the discovery message payload which would indicate the priority. The priority may just be an indication of the RSRP range measured on the Uu link, which the remote UE should take into account when performing the reselection.

An alternative way would be to use some specific physical communications resources for each priority. This has an advantage compared to including some bits in the discovery payload or D2DSS, because a remote UE can determine based on detection of the signal alone which relay UEs belong to which priority (or Uu RSRP range). Based on physical layer measurement only, without decoding any payload, the remote UE can perform the reselection evaluation taking into account the priority indicated implicitly by choice of physical resource for the D2DSS or discovery signal. There may for example be a pool of resource for each priority level.

Step 3

Once the remote UE has performed RSRP measurement of the relay UE signals, and received an indication of the priority level, then the reselection evaluation may take place. There are two main alternatives—to evaluate priority first then evaluation PC5, or vice-versa. To evaluate priority first, the UE would select the relay with the best PC5 RSRP measurement from amongst the measured relays with the highest priority. The alternative would be to define some PC5 RSRP ranges, then select the highest priority relay from those which fall within the highest range.

In the present disclosure, the term infrastructure unit aims to refer to any network node in the radio access network which can be found on the part from a source terminal (excluded) to a base station (included). It is noteworthy that although conventional terminals operating in a legacy network are unlikely to be considered as an infrastructure unit, in some examples, such as in some D2D cases, a terminal may sometimes be considered as an infrastructure unit, for example if it relays data or transmissions from other terminals to a base station (directly or indirectly). This term can thus include a base station for a macrocell, a base station for a small cell, a femtocell, a picocell, a relay node (operating in uplink and/or downlink), a terminal providing connectivity to one or more further terminals, etc.

As used herein, transmitting information or a message to an element may involve sending one or more messages to the element and may involve sending part of the information separately from the rest of the information. The number of "messages" involved may also vary depending on the layer or granularity considered.

In accordance with the present disclosure, when an uplink only relay node relays uplink signals, it may transmit relayed signals to the base station via one or more nodes (where the relayed signals are based on the received first uplink signals). For example, the signals may be transmitted to the base station via one or more relay nodes where some or all of them may be operating in one of an uplink-only mode or an uplink-and-downlink mode.

It is noteworthy that even though the present disclosure has been discussed in the context of LTE, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered paragraphs provide further example aspects and features of the present technique:

Paragraph 1. A mobile communications system comprising an infrastructure equipment and a plurality of communications terminals, wherein each of the communications terminals comprises a transmitter configured to transmit signals via a wireless access interface to the infrastructure equipment and to transmit signals via the wireless access interface to one or more of the other communications terminals, and a receiver configured to receive signals via the wireless access interface from the infrastructure equipment and to receive signals via the wireless access interface from one or more of the other communications terminals, wherein a first of the plurality of communications terminals is configured to determine, based on currently experienced communications conditions, one of a plurality of predetermined priority levels representing a relative ability of the first communications terminal to act as a relay node for a second of the plurality of communications terminals, and to transmit an indication of the determined priority level to the second communications terminals for one of the first communications terminal or one of the other communications terminals to be selected to act as a relay node for the second communications terminal.

Paragraph 2. A mobile communications system according to paragraph 1, wherein the second communications terminal is configured to receive from the first communications terminal the indication of the determined priority level, to receive from one or more of the other communications terminals indications of one of the plurality of predetermined priority levels, to select one of the first or one of the other communications terminals to act as a relay node for the second communications terminals, wherein the selecting comprises determining from which of the first or the one or more other communications terminals an indication of a best of the determined priority levels was received, and to transmit signals representing data to the selected communications terminal for transmission to the infrastructure equipment or to receive signals representing data from the infrastructure equipment via the selected communications terminal.

Paragraph 3. A mobile communications system according to paragraph 1 or 2, wherein the second communications terminal is outside a radio coverage area provided by the infrastructure equipment.

Paragraph 4. A mobile communications system according to paragraph 1, 2 or 3, wherein, upon predetermined conditions being met, the second communications terminal is configured to de-select the selected one of the first or one of the other communications terminals to act as a relay node, to select another of the first or one of the other communications terminals to act as a relay node for the second communications terminal, and to transmit signals representing data to the other selected communications terminal for transmission to the infrastructure equipment or to receive signals representing data from the infrastructure equipment via the other selected communications terminal.

Paragraph 5. A mobile communications system according to paragraph 4, wherein the predetermined conditions include determining that the second communications terminal no longer has a communications link to the selected one of the first or one of the other communications terminals.

Paragraph 6. A mobile communications system according to paragraph 4, wherein the predetermined conditions include determining that the other selected communications terminal transmitted an indication of a better determined priority level than the selected one of the first or one of the other communications terminals.

Paragraph 7. A mobile communications system according to any of paragraphs 1 to 6, wherein the selecting the one of the first or one of the other communications terminals to act as a relay node for the second communications terminal comprises determining with which of the first or one of the other communications terminals the second communications terminal has a best communications link.

Paragraph 8. A mobile communications system according to any of paragraphs 1 to 7, wherein the selecting the other of the first or one of the other communications terminals to act as a relay node comprises first determining which of the first or one of the other communications terminals transmitted indications of the best determined priority level, and consequently determining with which of the first or one of the other communications terminals which transmitted the indications of the best determined priority level the second communications terminal has the best communications link.

Paragraph 9. A mobile communications system according to any of paragraphs 1 to 7, wherein the selecting one of the first or one of the other communications terminals to act as a relay node comprises first determining which of the first or one of the other communications terminals the second communications terminal has a communications link with a quality above a predetermined threshold, and consequently determining which of the first or one of the other communications terminals with which the second communications terminal has the communications link with the quality above the predetermined threshold transmitted the indication of the best determined priority level.

Paragraph 10. A mobile communications system according to any of paragraphs 1 to 9, wherein the infrastructure equipment is configured to receive from the first communications terminal the indication of the determined priority level, to receive from the one or more of the other communications terminals indications of determined priority levels, and to select one of the first or one of the other communications terminals to act as a relay node.

Paragraph 11. A mobile communications system according to any of paragraphs 1 to 10, wherein the currently experienced communications conditions include a quality of the communications link between the first communications terminal and the infrastructure equipment.

Paragraph 12. A mobile communications system according to any of paragraphs 1 to 11, wherein the currently experienced communications conditions include an amount of data being transmitted received by the first communications terminal.

Paragraph 13. A mobile communications system according to any of paragraphs 1 to 12, wherein the currently experienced communications conditions include a number of the plurality of communications terminals which have selected the first communications terminal to act as a relay node for the number of the plurality of communications terminals.

Paragraph 14. A mobile communications system according to any of paragraphs 1 to 13, wherein the infrastructure equipment is configured to receive from the first communications terminal measurement information comprising the currently experienced communications conditions, to determine, based on the measurement information, one of the plurality of predetermined priority levels representing a relative ability of the first communications terminal to act as a relay node for the second communications terminal, and to transmit an indication of the determined priority level to the first communications terminal.

Paragraph 15. A mobile communications system according to any of paragraphs 1 to 14, wherein the indication of the determined priority level is transmitted to the second communications terminal as a part of a discovery message.

Paragraph 16. A mobile communications system according to any of paragraphs 1 to 15, wherein the indication of the determined priority level is transmitted to the second communications terminal as a part of a D2D synchronisation signal.

Paragraph 17. A mobile communications system according to any of paragraphs 1 to 16, wherein the indication of the determined priority level is transmitted to the second communications terminal in separate communications resources to any other determined priority level of the plurality of predetermined priority levels.

REFERENCES

[1] 3GPP TR36.872 V12.1.0, "Small cell enhancements for E-UTRA and E-UTRAN—Physical Layer aspects", December 2013.

[2] Holma H. and Toskala A., "LTE for UMTS OFDMA and SC-FDMA Based Radio Access", John Wiley & Sons Limited, January 2010. [3] LTE for UMTS: OFDMA and SC-FDMA Based Radio Access, Harris Holma and Antti Toskala, Wiley 2009, ISBN 978-0-470-99401-6.

The invention claimed is:

1. A mobile communications system comprising an infrastructure equipment and a plurality of communications terminals, wherein each of the communications terminals comprises:
    a transmitter configured to transmit signals via a wireless access interface to the infrastructure equipment and to transmit signals via the wireless access interface to one or more of the other communications terminals, and
    a receiver configured to receive signals via the wireless access interface from the infrastructure equipment and to receive signals via the wireless access interface from one or more of the other communications terminals, wherein
    a first of the plurality of communications terminals is configured to
    identify a parameter indicative of a communication condition currently experienced by the first of the plurality of communications terminals, wherein the parameter is indicative of a number of the plurality of communications terminals which have selected the first communications terminal to act as a relay node for the number of the plurality of communications terminals,
    determine a priority level from a plurality of predetermined priority levels each corresponding to a different predetermined range of the parameter and representing a relative ability of the first communications terminal to act as a relay node for the second of the plurality of communications terminals, wherein each of the priority levels communicated to the second communications terminal has a unique communications resource, and
    transmit only an indication of the determined priority level to the second communications terminal for one of the first communications terminal or one of the other communications terminals to be selected to act as a relay node for the second communications terminal.

2. The mobile communications system as claimed in claim 1, wherein the second communications terminal is configured to receive from the first communications terminal the indication of the determined priority level, to receive from one or more of the other communications terminals indications of one of the plurality of predetermined priority levels, to select one of the first or one of the other communications terminals to act as a relay node for the second communications terminals, wherein the selecting comprises determining from which of the first or the one or more other communications terminals an indication of a best of the determined priority levels was received, and to transmit signals representing data to the selected communications terminal for transmission to the infrastructure equipment or to receive signals representing data from the infrastructure equipment via the selected communications terminal.

3. The mobile communications system as claimed in claim 2, wherein the selecting the one of the first or one of the other communications terminals to act as a relay node for the second communications terminal comprises determining with which of the first or one of the other communications terminals the second communications terminal has a best communications link.

4. The mobile communications system as claimed in claim 3, wherein the selecting the other of the first or one of the other communications terminals to act as a relay node comprises first determining which of the first or one of the other communications terminals transmitted indications of the best determined priority level, and consequently determining with which of the first or one of the other communications terminals which transmitted the indications of the best determined priority level the second communications terminal has the best communications link.

5. The mobile communications system as claimed in claim 3, wherein the selecting one of the first or one of the other communications terminals to act as a relay node comprises first determining which of the first or one of the other communications terminals the second communications terminal has a communications link with a quality above a predetermined threshold, and consequently determining which of the first or one of the other communications terminals with which the second communications terminal has the communications link with the quality above the predetermined threshold transmitted the indication of the best determined priority level.

6. The mobile communications system as claimed in claim 2, wherein the infrastructure equipment is configured to receive from the first communications terminal the indication of the determined priority level, to receive from the one or more of the other communications terminals indications of determined priority levels, and to select one of the first or one of the other communications terminals to act as a relay node.

7. The mobile communications system as claimed in claim 2, wherein the second communications terminal is outside a radio coverage area provided by the infrastructure equipment.

8. The mobile communications system as claimed in claim 2, wherein, upon predetermined conditions being met, the second communications terminal is configured to de-select the selected one of the first or one of the other communications terminals to act as a relay node, to select another of the first or one of the other communications terminals to act as a relay node for the second communications terminal, and to transmit signals representing data to the other selected communications terminal for transmission to the infrastructure equipment or to receive signals representing data from the infrastructure equipment via the other selected communications terminal.

9. The mobile communications system as claimed in claim 8, wherein the predetermined conditions include determining that the second communications terminal no longer has a communications link to the selected one of the first or one of the other communications terminals.

10. The mobile communications system as claimed in claim 8, wherein the predetermined conditions include determining that the other selected communications terminal transmitted an indication of a better determined priority level than the selected one of the first or one of the other communications terminals.

11. The mobile communications system as claimed in claim 1, wherein the parameter is indicative of a quality of a communications link between the first communications terminal and the infrastructure equipment.

12. The mobile communications system as claimed in claim 1, wherein the parameter is indicative of an amount of data being transmitted received by the first communications terminal.

13. The mobile communications system as claimed in claim 1, wherein the infrastructure equipment is configured to receive from the first communications terminal measurement information comprising the currently experienced communications conditions, to determine, based on the measurement information, one of the plurality of predetermined priority levels representing a relative ability of the first communications terminal to act as a relay node for the second communications terminal, and to transmit an indication of the determined priority level to the first communications terminal.

14. The mobile communications system as claimed in claim 1, wherein the indication of the determined priority level is transmitted to the second communications terminal as a part of a discovery message.

15. The mobile communications system as claimed in claim 1, wherein the indication of the determined priority level is transmitted to the second communications terminal as a part of a D2D synchronisation signal.

16. The mobile communications system as claimed in claim 1, wherein the indication of the determined priority level is transmitted to the second communications terminal in separate communications resources to any other determined priority level of the plurality of predetermined priority levels.

17. A communications terminal forming part of a mobile communications system comprising an infrastructure equipment and one or more other communications terminals, the communications terminal comprising:
a transmitter configured to transmit signals via a wireless access interface to the infrastructure equipment and to transmit signals via the wireless access interface to one or more of the other communications terminals, and
a receiver configured to receive signals via the wireless access interface from the infrastructure equipment and to receive signals via the wireless access interface from one or more of the other communications terminals, wherein
the communications terminal is configured to
identify a parameter indicative of a communication condition currently experienced by the communications terminal, wherein the parameter is indicative of a number of the plurality of communications terminals which have selected the communications terminal to act as a relay node for the number of the plurality of communications terminals,
determine a priority level from a plurality of predetermined priority levels each corresponding to a different predetermined range of the parameter and representing a relative ability of the communications terminal to act as a relay node for one or more others of the plurality of communications terminals, wherein each of the priority levels communicated to the second communications terminal has a unique communications resource, and
transmit only an indication of the determined priority level to the one or more others of the plurality of communications terminals for the communications terminal to be selected to act as a relay node for the one or more others of the plurality of communications terminals.

18. A communications terminal for communicating via a mobile communications system comprising an infrastructure equipment and one or more other communications terminals, the communications terminal comprising:
a transmitter configured to transmit signals via a wireless access interface to the infrastructure equipment and to transmit signals via the wireless access interface to one or more of the other communications terminals, and
a receiver configured to receive signals via the wireless access interface from the infrastructure equipment and to receive signals via the wireless access interface from one or more of the other communications terminals, wherein
the communications terminal is configured to
receive from a first of the communications terminals an indication of a determined priority level, wherein the first of the communications terminals is configured to identify a parameter indicative of a communication condition currently experienced by the first of the communications terminals, wherein the parameter is indicative of a number of the communications terminals which have selected the first communications terminal to act as a relay node for the number of the communications terminals,
receive from the one or more of the other communications terminals indications of determined priority levels, wherein
the determined priority levels each correspond to a different predetermined range of a communication condition currently experienced by the first of the communication terminals and the one or more other communications terminals, and each of the priority levels communicated to the second communications terminal has a unique communications resource,
select one of the first communications terminal or one of the one or more other communications terminals to act as a relay node, wherein the selecting comprises determining from which of the other communications terminals an indication of a best determined priority level was received, and
transmit signals representing data to the selected communications terminal for transmission to the infrastructure equipment and to receive signals representing data from the infrastructure equipment via the selected communications terminal.

* * * * *